(12) United States Patent
Hassanzadeh et al.

(10) Patent No.: US 8,468,160 B2
(45) Date of Patent: Jun. 18, 2013

(54) SEMANTIC-AWARE RECORD MATCHING

(75) Inventors: Oktie Hassanzadeh, Toronto (CA); Anastasios Kementsietsidis, Hawthorne, NY (US); Lipyeow Lim, Honolulu, HI (US); Min Wang, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 12/610,101

(22) Filed: Oct. 30, 2009

(65) Prior Publication Data

US 2011/0106821 A1    May 5, 2011

(51) Int. Cl.
*G06F 17/30* (2006.01)

(52) U.S. Cl.
USPC .......................................... 707/748; 707/749

(58) Field of Classification Search
USPC .................................. 707/748, 749
See application file for complete search history.

(56) References Cited

U.S. PATENT DOCUMENTS

| | | | |
|---|---|---|---|
| 6,470,306 B1 * | 10/2002 | Pringle et al. ..................... | 704/3 |
| 6,523,019 B1 | 2/2003 | Borthwick | |
| 6,622,144 B1 * | 9/2003 | Rush, Jr. ....................... | 707/600 |
| 7,152,060 B2 | 12/2006 | Borthwick et al. | |
| 7,292,541 B1 | 11/2007 | C S | |
| 7,293,010 B2 | 11/2007 | Angele et al. | |
| 7,328,209 B2 | 2/2008 | Das et al. | |
| 7,403,936 B2 | 7/2008 | Giang et al. | |
| 7,505,450 B2 | 3/2009 | Castagnoli | |
| 7,522,571 B2 | 4/2009 | Ginzburg | |
| 7,546,287 B2 | 6/2009 | Subramaniam et al. | |
| 7,650,332 B2 | 1/2010 | Dumitru et al. | |
| 7,660,811 B2 | 2/2010 | Netz et al. | |
| 7,716,144 B2 | 5/2010 | McSherry et al. | |
| 7,756,882 B2 | 7/2010 | Aharoni et al. | |
| 7,814,107 B1 * | 10/2010 | Thirumalai et al. ........... | 707/749 |
| 7,882,122 B2 | 2/2011 | Wong | |
| 2004/0098405 A1 * | 5/2004 | Zrubek et al. ............. | 707/103 R |
| 2004/0260694 A1 * | 12/2004 | Chaudhuri et al. .............. | 707/5 |
| 2005/0027717 A1 | 2/2005 | Koudas et al. | |
| 2005/0273452 A1 | 12/2005 | Molloy et al. | |
| 2006/0007731 A1 | 1/2006 | Dumitru et al. | |
| 2006/0010139 A1 | 1/2006 | Netz et al. | |

(Continued)

FOREIGN PATENT DOCUMENTS

EP    1684192 A1    7/2006

OTHER PUBLICATIONS

Non-Final Office Action dated Feb. 1, 2012 for U.S. Appl. No. 12/609,657.

*Primary Examiner* — Christyann Pulliam
*Assistant Examiner* — Fariborz Khoshnoodi
(74) *Attorney, Agent, or Firm* — Cantor Colburn LLP; William Stock

(57) ABSTRACT

A method of semantic-aware record matching includes receiving source and target string record specifications associated with a source string record and a target string record, receiving semantic knowledge referring to tokens of the source string record and target string record, creating a first set of tokens for the source string record and a second set of tokens for the target string record based on the semantic knowledge, assigning a similarity score to the source string record and the target string record based on a semantic relationship between the first set of tokens and the second set of tokens, and matching the source string record and the target string record based on the similarity score.

20 Claims, 9 Drawing Sheets

101

| trial | cond | inter | loc | city | pub |
|---|---|---|---|---|---|
| NCT0033 | Beta-Thalassemia | Hydroxyurea | One University | New York | 14988 |
| NCT0057 | Hematologic Disease | Campath | Children's Hospital | Austin | 3058 |

102

| visitid | diag | prescr | location |
|---|---|---|---|
| VID770 | Thalassaemia | Hydroxyurea | Texas Hospital |
| VID777 | PCV | Hydroxycarbamide | NY Medical Center |

103

| name |
|---|
| Thalassemia |
| Blood_Disorders |

104

| name |
|---|
| Alemtuzumab |
| Hydroxyurea |

U.S. PATENT DOCUMENTS

| | | |
|---|---|---|
| 2006/0101423 A1 | 5/2006 | Aharoni et al. |
| 2006/0167856 A1 | 7/2006 | Angele et al. |
| 2007/0106638 A1 | 5/2007 | Subramaniam et al. |
| 2008/0215542 A1 | 9/2008 | Lim et al. |
| 2008/0235201 A1 | 9/2008 | McSherry et al. |
| 2009/0234823 A1 | 9/2009 | Wong |

* cited by examiner

101

| trial | cond | inter | loc | city | pub |
|---|---|---|---|---|---|
| NCT0033 | Beta-Thalassemia | Hydroxyurea | One University | New York | 14988 |
| NCT0057 | Hematologic Disease | Campath | Children's Hospital | Austin | 3058 |

102

| visitid | diag | prescr | location |
|---|---|---|---|
| VID770 | Thalassaemia | Hydroxyurea | Texas Hospital |
| VID777 | PCV | Hydroxycarbamide | NY Medical Center |

103

| name |
|---|
| Thalassemia |
| Blood_Disorders |

104

| name |
|---|
| Alemtuzumab |
| Hydroxyurea |

| id | diagnosis |
|---|---|
| r1 | Small Cell Lung Cancer |
| r2 | Small Cell Lung Carcinoma |
| r3 | Non-Small Cell Lung Carcinoma |
| r4 | Large Cell Lung Carcinoma |
| r5 | Recurrent Small Cell Carcinoma Lung Cancer |

502

| id | condition |
|---|---|
| s1 | Small Cell Lung Cancer |

503

| term1 | rel | term2 |
|---|---|---|
| Recurrent Small Cell Carcinoma Lung Cancer | is_a_type_of | Small Cell Lung Cancer |

504

| term1 | rel | term2 |
|---|---|---|
| Carcinoma | is_a_type_of | Cancer |
| Non-Small | is_antonym_of | Small |
| Large | is_antonym_of | Small |
| Recurrent | is_synonym_of | null |

FIG. 5

SEMANTIC-AWARE RECORD MATCHING

FIELD

This application relates to record matching, and in particular, to methods of supporting semantic aware record matching.

BACKGROUND

Generally, record matching, or finding records in a database that refer to the same entity or have a semantic relationship, is a challenging problem faced in many increasingly important data management applications. This task is often considered a critical part of data cleaning tools and ETL (Extract, Transform, Load) technologies. On the other hand, there is an increasing need for record matching in semantic data management and the semantic Web. Accurate and efficient matching of data records allows publication and maintenance of high-quality data sources and avoids creation of "islands of data" or "data silos", a problem well recognized in the semantic Web community.

Existing record matching techniques perform matching based on either string similarity, (ontology-based) semantic relationships, existence of co-occurrence information or limited combinations thereof. However, these techniques sometimes fail to capture many similarities occurring in real world matching and linking scenarios, or often result in false positives (i.e., match records that do not match). As supported by our experience in matching and linking records in many real data sets, a major source of the failure of existing techniques is lack of a flexible matching operator that apart from using string similarities and semantic relationships between full record values, may use semantic information about all different parts of the value stored in the records.

SUMMARY

According to at least one example embodiment, a method of semantic-aware record matching includes receiving source and target string record specifications associated with a source string record and a target string record, receiving semantic knowledge referring to tokens of the source string record and target string record, creating a first set of tokens for the source string record and a second set of tokens for the target string record based on the semantic knowledge, assigning a similarity score to the source string record and the target string record based on a semantic relationship between the first set of tokens and the second set of tokens, and matching the source string record and the target string record based on the similarity score.

According to another example embodiment, method of semantic-aware record matching includes receiving source and target string record specifications associated with a source string record and a target string record, tokenizing the source string record into substrings of variable length to form a first set of extended tokens with each token of the first set of extended tokens having a weight, the weight of each token associated with its commonality in the source string record specification, tokenizing the target string record into substrings of variable length q to form a second set of extended tokens with each token of the second set of extended tokens having a weight, the weight of each token associated with its commonality in the target string record specification, assigning a similarity score to the source string record and the target string record based on the weighted relationship of the first set of extended tokens with the second set of extended tokens, and matching the source string record and the target string record based on the similarity score.

According to another example embodiment, a computer readable storage medium includes computer executable instructions that, when executed on a computer processor, direct the computer processor to perform a method of semantic-aware record matching. The method includes receiving source and target string record specifications associated with a source string record and a target string record, receiving semantic knowledge referring to tokens of the source string record and target string record, creating a first set of extended tokens for the source string record and a second set of extended tokens for the target string record based on the semantic knowledge, assigning a similarity score to the source string record and the target string record based on a semantic relationship between the first set of extended tokens and the second set of extended tokens, and matching the source string record and the target string record based on the similarity score.

BRIEF DESCRIPTION OF THE SEVERAL VIEWS OF THE DRAWINGS

FIG. 1 is a diagram including sample relations between records across a plurality of data sources;

FIG. 5 is a diagram including sample records for matching;

DETAILED DESCRIPTION

Figure 2:
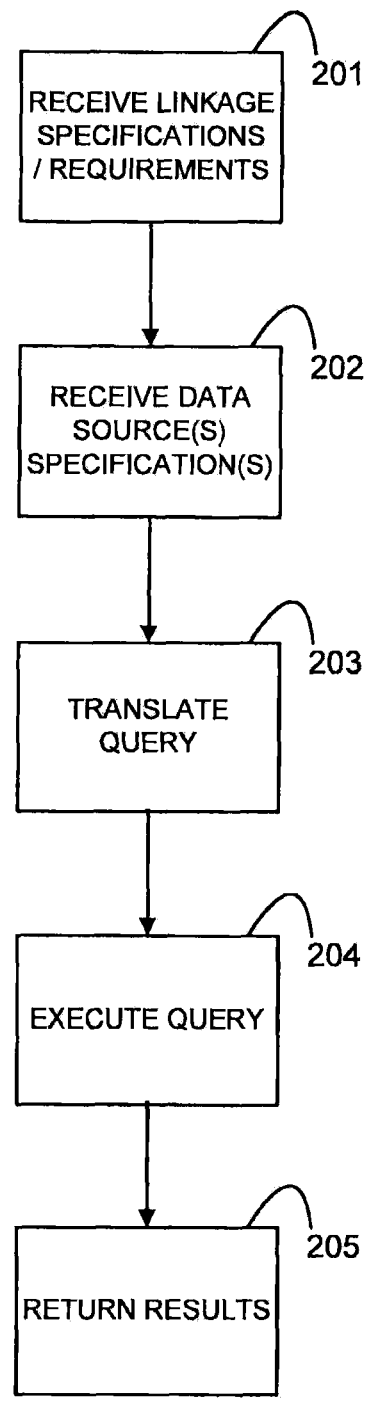
FIG. 2 is a flowchart of a method of semantic link discovery, according to an example embodiment.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein a database management system (DBMS) is any system and/or group of computer program(s) disposed to create, maintain, and/or utilize a database(s) and semantic information stored in said database(s).

Example embodiments provide a novel record matching operator that makes use of semantic information about different portions of record values as well as entire record values. More specifically, the operator takes advantage of semantic knowledge about tokens in the strings to enhance accuracy of a matching operation. Such an operator allows matching records that cannot be matched using other string or semantic matching methods, and more importantly avoids wrong matches resulting from matching based on only string or semantic similarity of full record values.

Example embodiments further provide methodologies of assigning a similarity score between two string records using semantic knowledge about tokens in the strings. Additionally, techniques for effective implementation of the operator and similarity functions. Example embodiments provide automatic and semi-automatic record matching techniques that take advantage of semantic knowledge from a user-defined or domain-specific ontology to enhance the effectiveness of the record matching task.

Hereinafter, example embodiments including both semantic link discovery and semantic-aware record matching using link discovery are described in detail with reference to the attached drawings.

FIG. 1 is a diagram including sample relations between records across a plurality of data sources. It is noted that FIG. 1 is provided as an example of relational data only, and the particular forms and types of information are provided for illustrative purposes only, and thus should not be construed as limiting.

Illustrated are relational data provided from a plurality of sources. For example, a first source may provide relational data 101, a second source may provide relational data 102, a third source may provide relational data 103, and a fourth source may provide relational data 104.

Data 101 includes six columns representing, for example, clinical trial information. The first column identifies a trial number, the second column identifies a clinical condition, the third column identifies a suggested intervention, the fourth column identifies a location, the fifth column identifies a city, the sixth column identifies a related publication.

Data 102 includes four columns representing, for example, patient electronic medial records (EMR) and includes patient visitation relations. The first column identifies a visit ID, the second column identifies a diagnosis, the third column identifies a recommended prescription, and the fourth column identifies a location.

Data 103 and 104 include a single column representing, for example, information about prescriptions and illnesses.

In the relational data illustrated in FIG. 1, there may be a plurality of links desired based on the context of a user's query. For example, a publisher desiring links to relational data involving the example data of FIG. 1 may wish links to be discovered between the condition column of data 101 and the diagnosis column of data 102. Further, patient visit "VID770" with diagnosis "Thalassaemia" in the data 102 relation should be linked to the trial "NCT0057" with condition "Hematologic Diseases" because "Thalassemia" is a type of "Hematologic Disease". Similarly, note that the intervention column in the data 101 relation may be linked to the prescription column in the data 102.

Additional correlations are possible considering the existence of links between the locations noted in the relational data. Thus correlations between city information and location information may be linked, in addition to other links as well.

Hereinafter, methods of semantic link discovery are described in detail.

FIG. 2 is a flowchart of a method of semantic link discovery, according to an example embodiment. The method 200 includes receiving linkage specifications/requirements at block 201. For example linkage specifications define the conditions that two given values must satisfy before a link may be established between said values. For example, Table 1 below defines a linkage specification using a basic declarative language:

TABLE 1

```
linkspec_stmt:= CREATE LINKSPEC linkspec_name
        AS link_method opt_args opt_limit;
linkindex_stmt:= CREATE LINKINDEX
                opt_idx_args linkindex_name
            ON table(col)
            USING link_method;
link_method:= native_link |link_clause_expr |UDF;
native_link:= synonym |hyponym |stringMatch;
link_clause_expr:= link_clause AND link_clause_expr
                |link_clause OR link_clause_expr
                |link_clause;
link_clause:= LINK source WITH target
        USING link_terminal opt_limit;
link_terminal:= native_link |UDF |linkspec_name
opt_limit:= LINKLIMIT number;
```

As shown in Table 1, the "CREATE LINKSPEC" statement defines a new linkage specification and accepts as parameters the name of the linkage specification and the names of relation columns whose values need to be linked (see FIG. 1). As also shown, the "native_link" establishes methods/algorithms for string matching which may be part of the linkage specification. For example, these algorithms may be based upon previously understood linkage algorithms including string similarity functions.

The "CREATE LINKINDEX" statement may be used to define a link index to speed up the linkage query execution. When a link index is defined, the output will contain a set of {\it preprocessing} queries that should be run prior to the other queries. This is particularly useful when the data is static where preprocessing can significantly reduce the query execution time.

A link specification may also be defined in terms of link clause expressions. Link clause expressions are boolean combinations of link clauses, where each link clause is semantically a boolean condition on two columns and is specified using either a native method, a user-defined function (UDF), or a previously defined linkage specification. It is noted that there is a mutually recursive nature of linkage specifications and link clauses. A linkage specification may be defined using link clauses while a link clause may be specified using previously defined linkage specifications.

The links between values are not necessarily one-to-one and, in general, a value from one relation may be linked to more than one value from a second relation. For example, it is common for medications to have more than one name. Therefore, while a medication appears as "aspirin" in one relation it might appear as "acetylsalicylic acid" or "ASA" in another. When such multiple links are possible, users often desire to limit the number of such links and only consider 'k' results, or the top-k if ordering is possible. The "LINKLIMIT" variable of Table 1 essentially specifies the value of this 'k' parameter.

It is noted that the "LINKLIMIT" variable may be considered in both local and global terms. For example, "LINKLIMIT" may be associated with a particular clause, or may be associated with an entire linkage specification. Thus the global variable form may be thought of as a post-processing filter of the links returned by the linkage specification methods used.

Hereinafter, user-defined functions and native methods which may be included in linkage specifications are described in detail.

A difference between utilizing a UDF versus a native linkage specification method is that the UDF allows only simple substitution-based rewriting of the query, whereas the native linkage specification methods use a non-trivial rewriting of the query into SQL which is discussed further below with reference to the remainder of the method 200.

The ability to use UDFs in link specification is provided for extensibility to non-SQL-based linking functions. Native implementations may have advantages however. Using native implementations, the query optimizer may optimize the processing of linkage specifications yielding efficient execution times. Furthermore, declarative implementations of the methods within a relational engine permit extensibility.

In a UDF, a user may implement a tailored similarity function based on a set of Boolean values which are relatively easy to translate into a standard query language. For example, a UDF may include simple arguments for returning a Boolean value if two or more strings include an "edit similarity" above a threshold value. The user may also define costs associated with deleting characters, inserting characters, and substituting characters to further refine the "edit similarity".

Native methods, however, may provide more complex string matching specifications. In a data source, some relevant portions of data are stored in the form of strings. String data is prone to several types of inconsistencies and errors including typos, spelling mistakes, use of abbreviations, or different conventions. Therefore, finding similar strings, or approximate string matching, is an important feature of an (online) link discovery framework. Approximate string matching may be performed based on a similarity function sim( ) that quantifies the amount of closeness (as opposed to distance) between two strings. A similarity threshold $\theta$ is set by a user to specify there is a link from the base record to the target record if their similarity score, returned by function sim( ) is above $\theta$. The right value of the threshold depends on the characteristics of the dataset, the similarity function, and the application. The user may find the optimal value of the threshold for each application by attempting different thresholds and manually evaluating the results.

There exists a variety of similarity functions for string data. The performance of a similarity function usually depends on the characteristics of data, such as length of the strings, and the type errors and inconsistencies present in the data.

A class of string similarity functions is based on tokenization of the strings into q-grams (i.e., substrings of length q of the strings). Through use of q-gram tokens, strings may be considered sets of tokens and use a set similarity measure as the measure of similarity between two strings. Furthermore, q-gram generation, storage, and set similarity computation may all be performed in SQL. Thus there are several classes of functions applicable to example embodiments.

One such class includes size of the intersection of the two sets of q-grams (i.e., the number of common q-grams in two strings).

Another class includes the Jaccard similarity of two sets of q-grams, which is the size of the intersection set over the size of the union (i.e., the percentage of common q-gram tokens between two strings).

Another class includes a weighted version of the above classes. The weight of each q-gram is associated with its commonality in the base (or target or both) data sources. The higher the weight of a q-gram, the more important the q-gram is. For example, if matching diagnosis across medical sources, q-grams for commonly occurring strings such as "Disorder" or "Cancer" should have low weights such that the value of the similarity function for the strings "Coagulation Disorder" and "Phonation Disorder" is small, compared to that for the strings "Coagulation Disorder" and "Coagulation Disease".

There are several other string similarity measures including but not limited to, Edit-Similarity, Jaro, Jaro-Winkler, SoftTFIDF, Generalized Edit similarity, and methods derived from relevance score functions for documents in information retrieval, namely Cosine with tf-idf, Okapi-BM25, Language Modeling and Hidden Markov Models. Some of these functions can be implemented in SQL and some others can only be implemented using a UDF. However, the above set-similarity based measures may be applicable due to their accuracy, efficiency, and their flexibility for functionality and efficiency enhancements, as discussed below.

One such string similarity class includes Token Weight Assignment. To assign weights to q-gram tokens, an approach similar to the Inverse Document Frequency (IDF) metric in information retrieval may be used. IDF weights reflect the commonality of tokens in documents with tokens that occur more frequently in documents having less weight. Thus, by analyzing (offline) the q-gram token frequency, less weight is assigned to common tokens like "Disorder" or "Cancer" in a medical source. As a functionality enhancement, the user may manually specify, in a user-defined table, the weights of some tokens. These weights override the automatically assigned (IDF-based) weights for these tokens. Manual weight-assignment is useful in applications where a user has prior knowledge about the importance of some tokens. For example, if matching diagnosis across sources, the user may understand that often the use of numbers plays a more important role in the diagnosis than the name of the disease itself. Thus, by assigning a very low (or negative) weight to numbers, incorrect matches between highly similar strings such as "Type 1 Diabetes" and "Type 2 Diabetes" may be avoided. Similarly, if matching conditions (e.g., "Diabetes", "Cancer") from an online source to their corresponding entries another database, the conditions in the other database may include the term "(disease)" to disambiguate the disease from other terms with the same name (e.g., "Cancer" has close to seven entries in some databases, in addition to a single entry for the disease, including one for astrology and one for the constellation). Knowing this, a user may adjust the weight of the otherwise common token "disease" to increase the likelihood of a correct link.

Link discovery between values often requires the use of domain knowledge. In a number of domains, there are existing and commonly accepted semantic knowledge bases that can be used to this end. In domains where such semantic knowledge is not available, users often manually define and maintain their own knowledge bases.

In addition to receiving linkage specifications, the method 200 may further include receiving data source specifications at block 202. The data source specifications may include at least one data source from which to consider relational data for link creation based on the received linkage specifications. For example, the data source specifications may include identification of local and remote data sources such as databases, networked storage systems, websites, and/or any other suitable data source. The linkage specifications and the data source specifications, if taken together, form a basic query. This query, as described using basic declarative language as described in Table 1, may be at first incompatible with existing standard query languages used by data sources included in the data source specifications.

Therefore, the method 200 further includes translating the query at block 203. The query may be translated to a standard query language, for example Structured Query Language (SQL), through the use of two basic algorithms. The first algorithm termed "LINQL2SQL" is described below with reference to Table 2:

TABLE 2

(LINQ2SQL):

input: LinQL query L
output: SQL query Q
    1 lce ← extract link clause expr. from L;
    2 $Q_{base}$ ← L - lce;
    3 Q ← LINKCLAUSEEXPR2SQL($Q_{base}$, lce );
    4 return Q;

The second algorithm termed "LINKCLAUSEEXPR2SQL" is referenced by the first algorithm, and is described below with reference to Table 3:

TABLE 3

(LINKCLAUSEEXPR2SQL):

1 if lce 6= ∅ then
2     l ←next link clause in lce;
3     Q ← LINKCLAUSE2SQL(Qbase, l);
4     if operator = AND then
5         Q ← LINKCLAUSEEXPR2SQL(Q, lce – l);
6     else if operator = OR then
7         Q ← Q + 'UNION' +
            LINKCLAUSEEXPR2SQL(Qbase, lce – l);
9 return Q;

The translation operations of both the first and second algorithms is described with reference to Structured Query Language (SQL), however, it is understood that any standard query language is equally applicable to example embodiments depending upon any desired or necessary implementation.

The first algorithm translates a basic declarative language query to a SQL query by first dividing the basic declarative language query into a base query template (which is a standard query language template) and a link clause expression. The link clause expression is translated into SQL through the second algorithm by iterating through the boolean combination of link clauses and generating a separate SQL query for each clause. Subsequently, the boolean combination of link clauses is translated into a set of intersections/unions between the generated SQL queries.

The second algorithm parses a link clause to determine what type of link terminal is used. If the link terminal is a user defined function (UDF), an invocation of the UDF is added in the "where" clause of the SQL query base template. If the link terminal is a native link, the SQL query base template is re-written using the rewrite rules associated with that particular native link. If the link terminal is a reference to a named linkage specification, the associated linkage specification statement is retrieved and the associated link method is parsed. The link method may be a UDF, native link, or link clause expression. UDFs and native links are translated as described previously. Link clause expressions are translated by a recursive call to the second algorithm. The recursion terminates if either a UDF or a native link is encountered. The translation logic includes rewriting rules associated with native links. A native link's rewriting rules are specified in two parts including view definitions and link conditions. Hereinafter, additional algorithms are presented with regards to translation of native link methods.

The rewriting of the approximate string matching native link specification into SQL consists of three steps, namely, the creation of tables containing the tokenization of the strings into q-grams or word tokens, the gathering of statistics and calculation of token weights from the token tables, and the calculation of link scores based on the weights.

The creation of tables containing the tokenization of the strings into q-grams or word tokens may be performed fully in SQL using standard string functions present in almost every DBMS. For example, a table of integers exists that stores integers 1 to N (maximum allowable length of a string). Basic string functions SUBSTR and LENGTH may be used along with the sequence of integers in table integers to create substrings of length q from the string column col1 in table tableA. The following SQL code shows this idea for q=3:

TABLE 4

SELECT tid, SUBSTR(col1,integers.i,3) as token
FROM integers INNER JOIN tableA
    ON integers.i <= LENGTH(col1) + 2

In practice, the string col1 is used along with UPPER( ) (or LOWER( )) functions to make the search case insensitive. Also, the string may be padded with q−1 occurrences of a special character not in any word (e.g. '$') at the beginning and end using the CONCAT( ) function. Similarly spaces in the string are replaced by q−1 special characters. In case of tokenization using word tokens a similar SQL-based approach may be used. At the end of this process, the token generation queries are declared as views, or are materialized in tables such as tableA_col1_tokens and tableB_col2_tokens.

The gathering of statistics and calculation of token weights from the token tables, and the calculation of link scores based on the weights are partly native-link specific and are more easily presentable through an example. Hereinafter, the weighted Jaccard specification is used as an example.

TABLE 5

```
SELECT PV.visitid, CT.trial
FROM visit AS PV, trial AS CT
WHERE PV.visitid = 1234 AND CT.city='NEW YORK' AND
    PV.diag = CT.cond
LINK PV.diag WITH CT.cond
USING weightedJaccard
```

The link specification of Table 5 is translated into the SQL queries of Table 6. Initially, two queries calculate the IDF weights for the tokens and the auxiliary views/tables needed for the final score calculation:

TABLE 6

```
CREATE VIEW visit_diagnosis_weights AS
SELECT token, LOG(size − df + 0.5) − LOG(df+0.5) as
weight
    FROM ( SELECT token, count(*) as df
    FROM (SELECT * FROM visit_diagnosis_tokens
    GROUP BY tid, token) f
    GROUP BY token ) D,
    ( SELECT count(*) as size
    FROM visit_diagnosis_tokens ) S
CREATE VIEW visit_diagnosis_sumweights AS
SELECT tid, B.token, weight
FROM visit_diagnosis_tokenweights idf,
(SELECT DISTINCT tid, token
FROM visit_diagnosis_tokens B) B
WHERE B.token = idf.token
CREATE VIEW visit_diagnosis_tokenweights AS
SELECT tid, sum(weight) as sumw
FROM visit_diagnosis_weights
GROUP BY tid
```

A subsequent query returns the links along with their final scores:

TABLE 7

```
WITH scores(tid1, tid2, score) AS (
SELECT tid1, tid2,
(SI.sinter/(BSUMW.sumw+QSUMW.sumw−SI.sinter))
AS score
FROM (SELECT BTW.tid AS tid1,QT.tid AS tid2,
SUM(BTW.weight) AS sinter
FROM (SELECT * FROM visit_diagnosis_weights
WHERE id = 1234) AS BTW,
trials_condition_tokens AS QT
WHERE BTW.token = QT.token
GROUP BY BTW.tid, QT.tid) AS SI,
(SELECT *
FROM visit_diagnosis_sumweights
WHERE id = 1234 ) AS BSUMW,
(SELECT Q.tid, SUM(BTW.weight) AS sumw
FROM trials_condition_tokens Q,
visit_diagnosis_tokenweights AS BTW
WHERE 1=1 AND Q.token = BTW.token
GROUP BY Q.tid ) AS QSUMW
WHERE BSUMW.tid=SI.tid1 and SI.tid2 = QSUMW.tid )
SELECT PV.visitid, CT.trial
FROM scores AS S, visit AS PV, trials AS CT,
WHERE PV.visitid = 1234 AND CT.city='NEW YORK' AND
    S.tid1=PV.visitid AND S.tid2=t.trial AND
    S.score>0.5
```

As an example scenario, the synonym and hyponym data are stored in two tables, synonym and hyponym, with columns src and tgt. The column src contains concept IDs of the terms, and the column tgt contains the terms. Alternatively, this data may be stored in a table thesaurus with an additional column rel that stores the type of the relationship, or it may be stored in extensible mark-up language (XML). In the case of XML, synonym and hyponym may be views defined in a hybrid XML relational DBMS such as DB2. For the sake of brevity, this disclosure includes discussion of semantic knowledge stored as relational data, although example embodiments are extensible to other formats. The details of the SQL implementation of the synonym and hyponym native link specifications are show in Tables 8-9:

TABLE 8

```
SELECT PV.visitid, CT.trial
FROM visit AS PV, trial AS CT
WHERE PV.visitid = 1234 AND CT.city='NEW YORK' AND
    PV.diag = CT.cond
LINK PV.diag WITH CT.cond
USING synonym
``` which is re-written to:

TABLE 9

```
SELECT DISTINCT PV.visitid, CT.trial
FROM trials AS CT, visit AS PV, synonym AS syn
WHERE PV.visitid = 1234 AND CT.city='NEW YORK' AND
(src in (SELECT src
FROM synonym s
WHERE s.tgt = CT.cond))
AND PV.diag = syn.tgt
UNION
SELECT PV.visitid, CT.trial
FROM trials AS CT, visit AS PV
WHERE PV.visitid = 1234 AND CT.city='NEW YORK' AND
CT.cond = PV.diag
```

For the hyponym example, Tables 10-11 are provided:

TABLE 10

```
SELECT PV.visitid, CT.trial
FROM visit AS PV, trial AS CT
WHERE PV.visitid = 1234 AND CT.city ='NEW YORK' AND
    PV.diag = CT.cond
LINK PV.diag WITH CT.cond
USING hyponym
```

Which is re-written to:

TABLE 11

```
WITH traversed(src, tgt, depth) AS (
(SELECT src, tgt, 1
FROM hyponym AS ths
UNION ALL
(SELECT ch.src, pr.tgt, pr.depth+1
FROM hyponym AS ch, traversed AS pr
WHERE pr.src=ch.tgt AND
pr.depth<2 AND ch.src!='root_node'))
SELECT distinct PV.visitid, CT.trial
FROM trials AS CT, visit AS PV, hyponym AS ths
WHERE PV.id = 1234 AND CT.city ='NEW YORK' AND
(src in (SELECT distinct src
FROM traversed tr
WHERE tr.tgt = CT.cond)) AND
PV.diag = ths.tgt
```

Turning back to FIG. 2, upon execution of the query at block 204, the query results are returned at block 205. As an alternative to simply receiving linkage specifications, and as noted above, users may define parameters to fully describe linkage methods/algorithms (i.e., UDFs and native methods).

Each native link specification results in a distinct query which can be evaluated independently. However, in certain settings, the queries of different native link specifications need to cooperate. This is the case when the user sets a global linklimit value. Then, the queries from different link specifications need to cooperate so that we avoid running potentially expensive linkage queries when there are already enough links returned to the user. To achieve such cooperation, the LINKCLAUSEEXPR2SQL algorithm needs to be modified. We assume that the sequence of the specifications reflects their importance, i.e., the specification that appears first must be evaluated first. To this end, a condition must be added at the end of each SQL code to limit the number of results returned (using, for example, MySQL's LIMIT). Then, in Algorithm LINKCLAUSEEXPR2SQL, in addition to using UNION another condition should be added at the end of each query (in their WHERE clause) to check for the number of links returned by the previous query.

Figure 3:
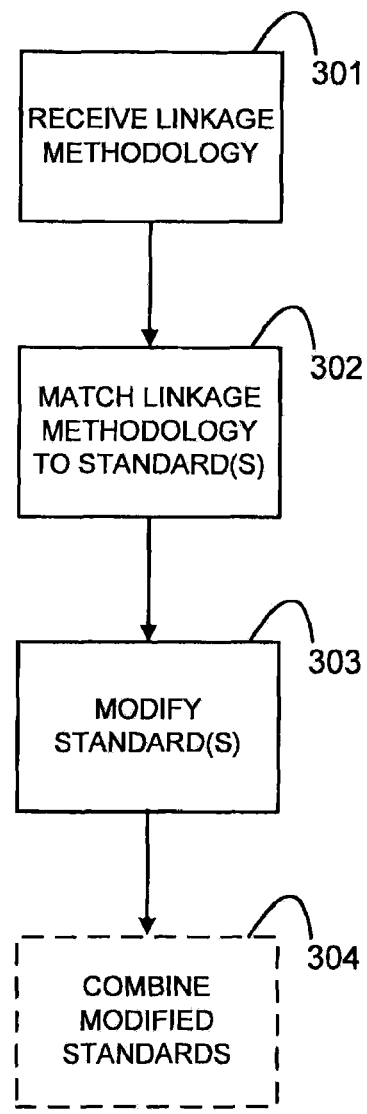
FIG. 3 is a flowchart of a method of semantic link discovery, according to an example embodiment.

FIG. 3 is a flowchart of a method of semantic link discovery, according to an example embodiment. The method 300 may include receiving a linkage methodology at block 301. For example, the linkage methodology may include a plurality of parameters describing a methodology. The methodology may be a UDF or a native function, or any combination thereof. The method 300 further includes matching the linkage methodology to standard language methodologies, for example SQL re-writes of the received methodologies. Thereafter, the method 300 includes modifying the matched standard methodologies. For example, the parameters of the matched standard methodologies may be replaced by the received parameters of the received linkage methodologies.

It is noted that the received linkage methodologies may include one or more methodologies. Therefore, the method 300 may further include combining the modified standard methodologies at block 304. Additionally, it is noted that parts or all of methods 200 and 300 may be combined.

Figure 4:
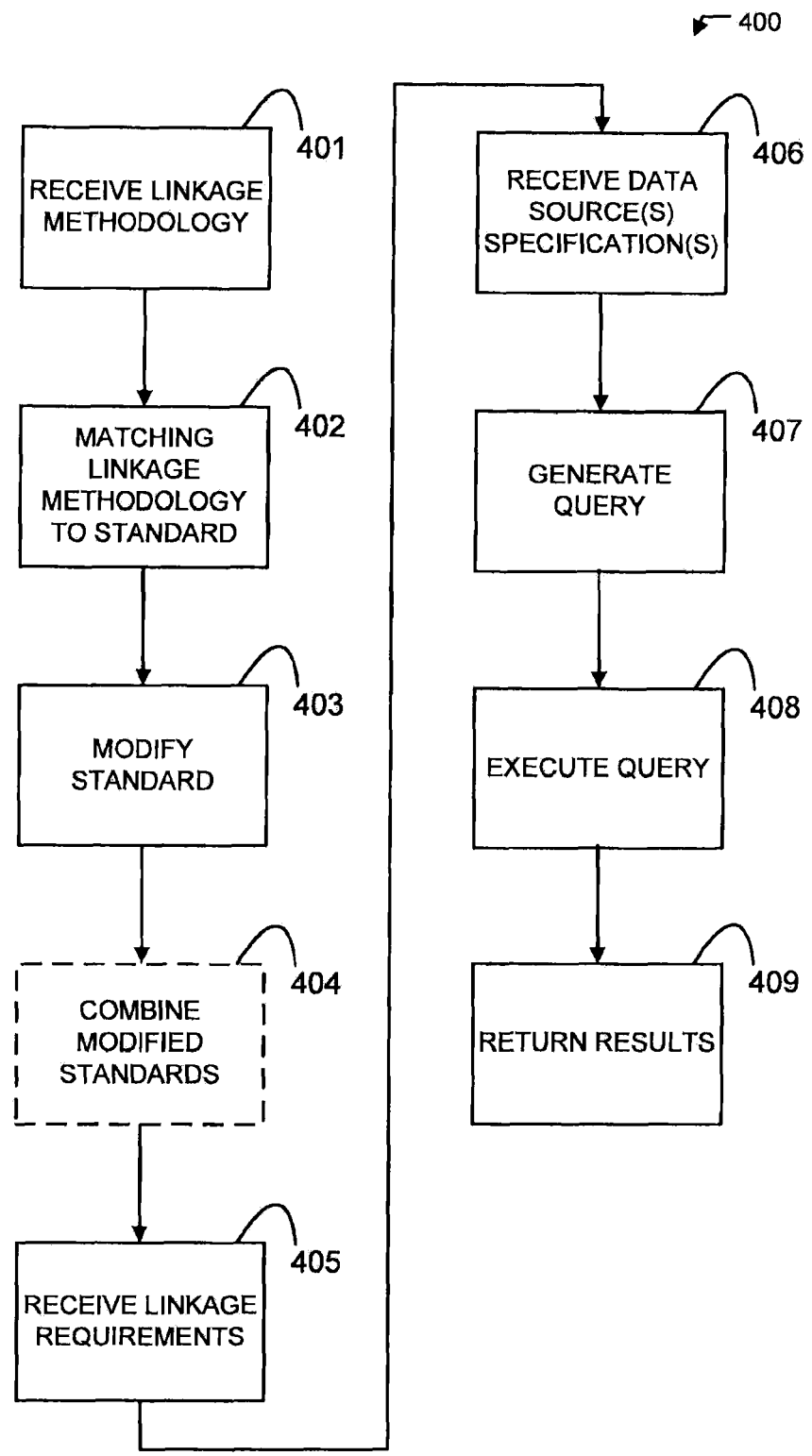
FIG. 4 is a flowchart of a method of semantic link discovery, according to an example embodiment.

FIG. 4 is a flowchart of a method of semantic link discovery, according to an example embodiment. The method 400 may be considered a combined method comprised of feature of both methods 200 and 300. The method 400 includes receiving linkage methodologies at block 401. The received methodologies may be matched to standard methodologies (402), the standard methodologies may be modified and/or combined (403-404).

Additionally, the method 400 includes receiving linkage specifications and data source specifications (405-406). The method 400 may further include translating the query represented by the received linkage specifications, data source specifications, and modified/combined standard methodologies at block 407. Thereafter the query may be executed and results returned to the user (408-409).

Hereinafter, methods of semantic-aware record matching are described in detail with reference to FIGS. 5-7. It is noted that the example embodiments described with reference to FIGS. 5-7 incorporate portions of the methodologies described with reference to FIGS. 1-4, particularly similarity functions including the Jaccard Similarity Score, the Weighted Jaccard Similarity Score, and tokenization of strings into q-grams which are described in detail above with regards to translation of native and user-defined similarity functions. Thus redundant and exhaustive description is omitted for the sake of brevity.

FIG. 5 is a diagram including sample relational data for matching. Illustrated are relational data 501 and 502. Each relational data is organized in tables with two columns. A first column represents an ID and a second column represents a diagnosis/condition. As used herein, Patient Visits (PV) refers to the data 501. Furthermore, Trial Condition (TC) refers to the data 502.

Generally, matches should be made for similar strings contained in the second column of each data 501 and 502. If for example, a query includes instructions to match string attribute str1 (second column) from relation r1 to string attribute str2 (second column) from relation r2. Based on the type of matching, an operator is used as a join condition (e.g., in the WHERE clause of a standard SQL query) to match the two attributes. In a case where the goal is finding duplicate attributes that exactly match, an operator as described in Table 12 below may be used:

TABLE 12

SELECT PV.id as id1, TC.id as id2
FROM VISITS PV, TRIALS TC
WHERE PV.diagnosis = TC.condition As written, an exact match is determined, where (r1, s2) is returned as the only record match. Thus, records r2 and r5 are missed. It follows that due to errors being apparent in many strings, including different spellings, typographical errors, and other similar errors, exact string matching will exclude many records matches which would otherwise be correct. In another scenario, a threshold may be used alongside a string similarity function to determine similar strings within (i.e., either above or below) a desired threshold. Such is presented in Table 13 below:

TABLE 13

SELECT PV.id as id1, TC.id as id2
FROM VISITS PV, TRIALS TC
WHERE string_sim (PV.diagnosis,TC.condition) > thr As written, the similarity function, string_sim, determines if there is a string similarity greater than the threshold thr. In this example, if the threshold is set high, record matches may be returned for (r1, s1), (r2, s1), and (r3, s1). Thus, a record match for r5 is missed, while a false match for record r3 is returned. However, if the threshold is lowered, all records may be matched, thus returning a false match for records r3 and r4.

In addition to simple string matching and similarity scores, the use of ontology records may provide further refinement of record matching. For example, as illustrated in FIG. 5, ontology tables 503 and 504 provide semantic knowledge about terms in relation data 501 and 502. Hereinafter, ontology table 503 is referred to as ont1, and ontology table 504 is referred to as ont2. Table 14 below provides one example of semantic-aware record matching using ontology table 503:

TABLE 14

SELECT PV.id as id1, TC.id as id2
FROM VISITS PV, TRIALS TC
WHERE PV.diagnosis = TC.condition OR
ont_related(ont1,PV.diagnosis,TC.condition)

As written, the function ont_related provides matching between relation data 501 and 502 taking into consideration the semantic knowledge of ontology table 503. Thus, (r1, s1) and (r5, s1) are returned as matching records. However, a match with record r2 is missed. Thus, further semantic may be useful in returning all matching records. Table 15 below shows an example where the semantic knowledge of ontology table 504 is used:

TABLE 15

SELECT PV.id as id1, TC.id as id2
FROM VISITS PV, TRIALS TC
WHERE semantic_match(ont2,PV.diagnosis,TC.condition)

As written, the function semantic_match provides matching between relation data 501 and 502 taking into consideration the semantic knowledge of ontology table 504. Thus, (r1, s1), (r2, s1) and (r5, s1) are returned as matching records, which include all correctly matching records of FIG. 5. It follows that use of semantic knowledge when considering record matches increases accuracy by increasing correct matches and reducing false matches. Hereinafter, tokens and semantic knowledge of tokens is discussed with reference to FIG. 6.

Figure 6:
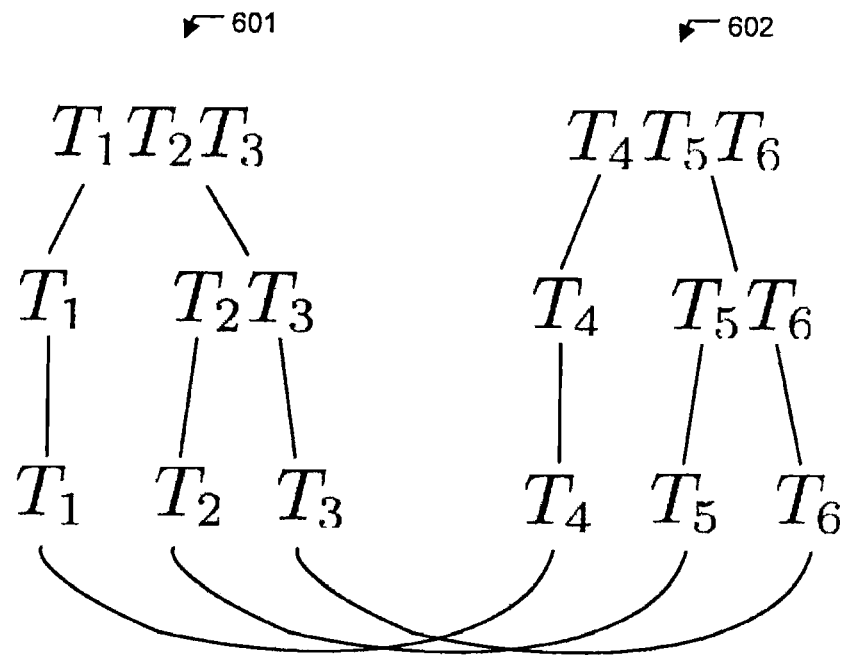
FIG. 6 is a diagram of an example similarity calculation, according to an example embodiment.

FIG. 6 is an example similarity calculation using tokens, according to an example embodiment. As illustrated, strings 601 and 602 may be divided into three tokens. It is noted that any number of strings may be used, and these strings may be divided into any number of tokens, thus example embodiments should not be limited to only the number of tokens/strings illustrated.

In a tokenizing operation, string 601 may be tokenized into tokens T1, T2, and T3. Also, string 602 may be tokenized into tokens T4, T5, and T6. Upon tokenizing the strings, a similarity score may be determined between tokens of strings 601 and 602. For example, each token may be compared to each token of another string. The similarity score of each token may be summed to establish an overall similarity score for the relationship between the two strings.

The similarity scores, implemented in a similarity function, may be used along with a threshold value to implement a record-matching operator somewhat similar to those examples shown in Tables 12-15. Further, the similarity scores may be used to rank results if there are several matches with a single record. One class of similarity functions termed "Semantic Set Similarity" functions calculate the similarity score using a source of semantic knowledge such as an existing ontology or a user-defined table of semantic relationships to extend source target sets with semantic alternatives. Each alternative is marked with the type of the semantic relationship used.

Optionally, weights may be assigned to the tokens in extended sets that reflect the commonality of the tokens in the source and/or target collection (i.e., a frequent token may have a lower weight than a rare token). Further, a user may assign a positive or negative weight to each type of semantic relationship. The weights may be adjusted for each semantic relationship. For example, antonyms may have negative weight adjustments while synonyms may have positive adjustment weights which may also be higher than hyponym adjustment rates.

Additionally, a score may be assigned to the two extended sets that reflect the percentage of common tokens in the two sets. This score may also use the weights of the tokens as well as weights associated with semantic relationships.

Additionally, Semantic Cosine Similarity functions may calculate the similarity score with each extended set along with weights treated as a vector of weights. The similarity score may then be calculated as the inner product of the two vectors. For example, Equation 1 below provides an example of a Semantic Cosine Similarity function:

$$sim_{cosine}(S_1, S_2) = \sum_{t \in S_1 \cap S_2} w_1(t, S_1) w_2(t, S_2) \qquad \text{Equation 1}$$

According to Equation 1 above, $w_1(t, S_1)$, $w_2(t, S_2)$ are normalized tf.idf weights of an inverse document frequency (IDF) function for the compared strings. Additionally, Semantic Jaccard (SJ) similarity functions may be used. In SJ functions, sets with additional elements which include desired semantic relationships may be extended. Thereafter, a similarity score may be calculated as the size of the intersection over the size of the union. Also, Weighted Semantic Jaccard (WSJ) similarity function may be used. WSJ functions may assign weights to each element as described above. For example, IDF weights or user-defined weights may be used in the calculation, in addition to adjusted weights as described above. Equation 2 below shows such a similarity function:

$$\sum_{t \in RELATED(ont, S_1) \cap RELATED(ont, S_2)} w(t, S_1) \cdot w(t, S_2) \cdot w_{adj}(t, ont) \qquad \text{Equation 2}$$

Hereinafter, methods of semantic-aware record matching using the tokenization and similarity scores provided above are described in detail.

Figure 7:
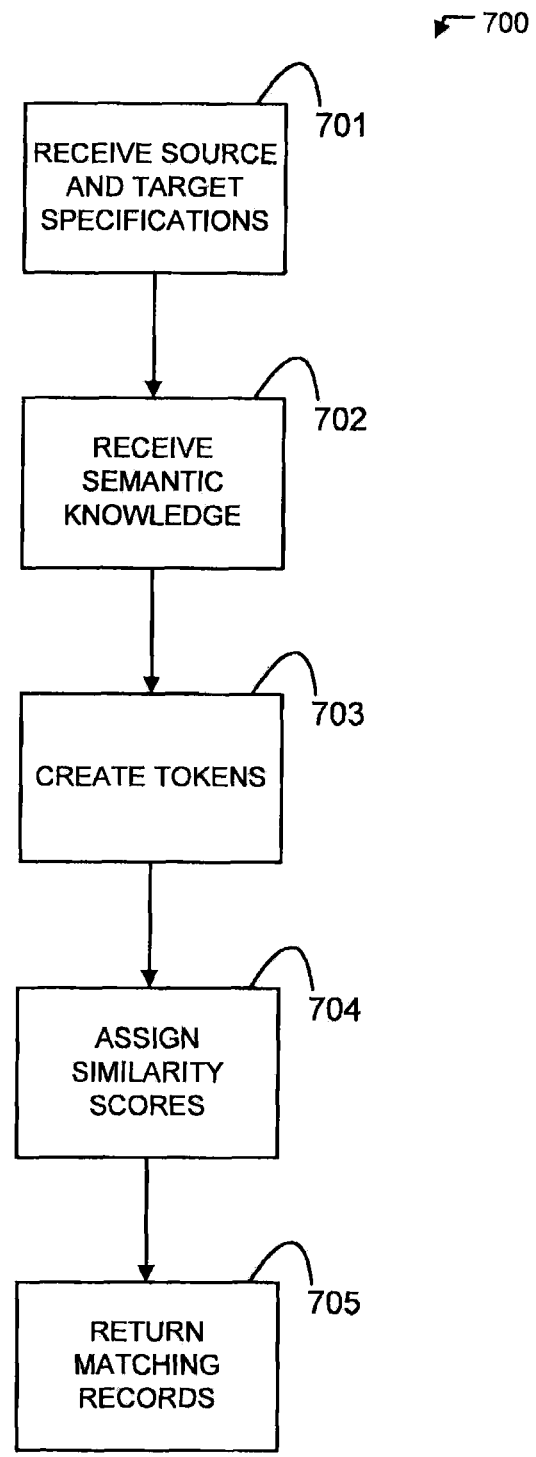
FIG. 7 is a flowchart of a method of semantic-aware record matching, according to an example embodiment.

FIG. 7 is a flowchart of a method of semantic-aware record matching, according to an example embodiment. Method 700 includes receiving specifications of source and target string records at block 701. For example, relation data 501 and 502 described above may be considered source and target record sources. The method 700 further includes receiving semantic knowledge about tokens for the source and target string records at block 702. The semantic knowledge may be extracted from a source of semantic knowledge such as an existing ontology or a user-defined table of semantic relationships to extend source target sets with semantic alternatives.

Thereafter, the method 700 includes creating tokens from the source and target string records using the received semantic knowledge. For example, the source and target string records may be tokenized (i.e., tokens are created) in a manner somewhat similar to that illustrated in FIG. 6. The method 700 further includes assigning similarity scores to the source and target string records based on corresponding tokens. The similarity scores may be summed and judged on a threshold to establish matching records. Thereafter, the method 700 includes returning sets of matching records based on the overall similarity score for each record of the source and target string records. As noted above, example embodiments are not limited to only tokens as weights may also be assigned to further refine record matching.

Figure 8:
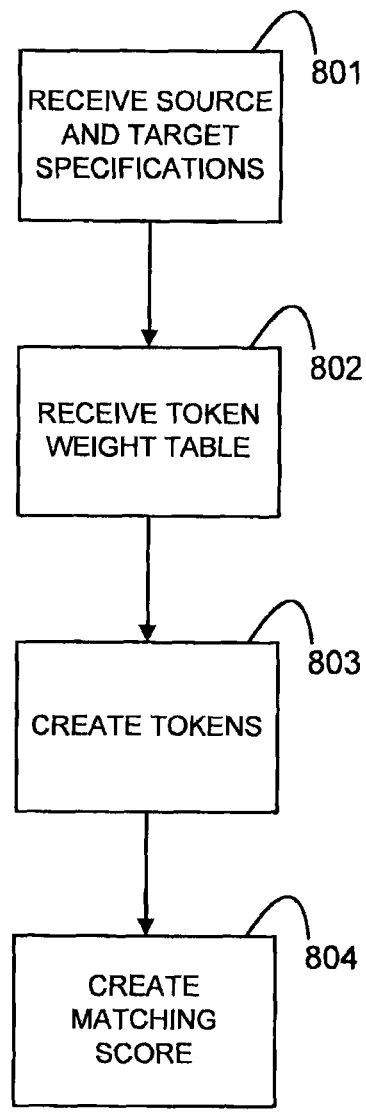
FIG. 8 is a flowchart of a method of semantic-aware record matching, according to an example embodiment.

FIG. 8 is a flowchart of a method of semantic-aware record matching, according to an example embodiment. Method 800 includes receiving specifications of source and target string records at block 801. For example, relation data 501 and 502 described above may be considered source and target record sources.

The method 800 further includes receiving a token weight table at block 802. The token weight table may include particular weights and/or weight adjustments for tokens of the source and target string records. The method 800 further includes creating a set of tokens for the source and target string records. Thereafter, the method 800 includes creating a matching score for the source and target string records using the received token weight table. The matching score may be compared to a threshold to determine sets of matching records.

Therefore, as described above, example embodiments provide methodologies of supporting semantic-aware record matching. A source of semantic knowledge, such as an existing ontology or a user-defined table of semantic relationships, is used to determine a set of alternative representations for each string, and mark each alternative with the type of the semantic relationship used. Depending on the matching scenario, the two strings are matched if at least one of their alternatives match using desired semantic relationships or do not match the records if at least one of the alternatives match using unwanted semantic relationships. Also, if data is stored in a relational DBMS, matching and similarity computation may utilize standard SQL queries which may run over any relational DBMS. The standard SQL queries may also be represented by the basic framework discussed above with reference to FIGS. 1-4. Thus token tables, semantic relationships, and alternatives may be represented in tables in the DBMS. Using these tables, matching and/or similarity computation may be performed by a SQL script.

Figure 9:
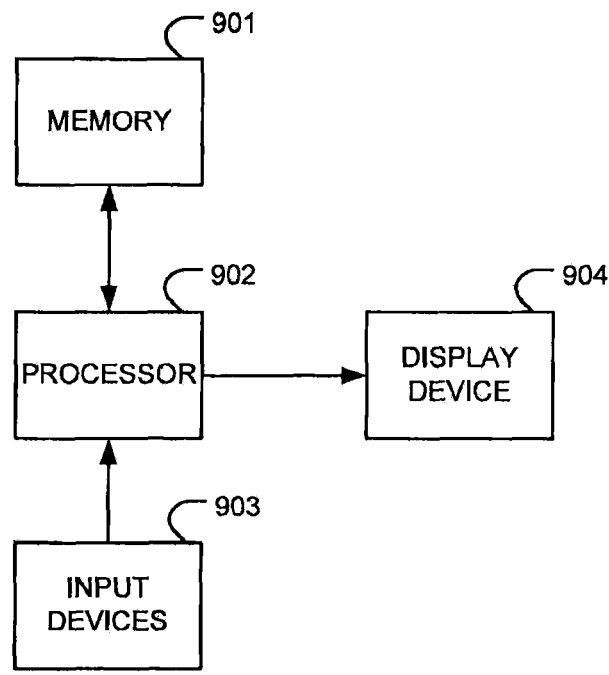
FIG. 9 is a computing apparatus, according to an example embodiment.

As described in detail herein, example embodiments provide methods of semantic-aware record matching. Additionally, the methodologies of example embodiments of the present invention may be implemented in hardware, software, firmware, or a combination thereof. For example, according to an exemplary embodiment, the methodologies described hereinbefore may be implemented by a computer system or apparatus. For example, FIG. 9 illustrates a computer apparatus, according to an exemplary embodiment. Therefore, portions or the entirety of the methodologies described herein may be executed as instructions in a processor 902 of the computer system 900. The computer system 900 includes memory 901 for storage of instructions and information, input device(s) 903 for computer communication, and display device 904. Thus, the present invention may be implemented, in software, for example, as any suitable computer program on a computer system somewhat similar to computer system 900. For example, a program in accordance with the present invention may be a computer program product causing a computer to execute the example methods described herein.

The computer program product may include a computer-readable medium having computer program logic or code portions embodied thereon for enabling a processor (e.g., 902) of a computer apparatus (e.g., 900) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks, cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method of semantic-aware record matching, comprising:
    receiving a source and target string records, wherein the source string record comprises a first set of tokens and the target string record comprises a second set of tokens;
    receiving semantic knowledge referring to the tokens of the source string record and target string record;
    calculating a similarity score for each pairing of the tokens of the first set and the tokens of the second set based on the semantic knowledge, wherein the similarity score is also based on a weight assigned to each of the tokens in the first set based on a commonality of the token in the source string record and assigned to each of the tokens in the second set based on a commonality of the token in the target string record;
    calculating an overall similarity score based on the similarity scores;
    determining if the source string record and the target string record match based on the overall similarity score; and
    indicating results of the determining.

2. The method of claim 1, further comprising extending the first set of tokens to create an extended first set of tokens and the second set of tokens to create an extended second set of tokens based on the received semantic knowledge.

3. The method of claim 2, further comprising receiving a set of weight values related to the extended first and second sets of extended tokens and calculating a similarity score for the extended first and second sets of extended tokens based on the received weight values.

4. The method of claim 2, further comprising assigning weight values to each token of the extended first and second sets of extended tokens, each weight representing a level of importance of a token in a corresponding string record.

5. The method of claim 2, wherein assigning the overall similarity score includes computing the inner product of a vector of weights of the extended sets of tokens.

6. The method of claim 1, further comprising receiving a weight table assigning weights to specific tokens of the first set of extended tokens and the second set of tokens.

7. The method of claim 6, wherein assigning the similarity score includes calculating similarity scores for the first set of extended tokens and the second set of extended tokens based on the received weight table.

8. The method of claim 2, wherein creating the first set of extended tokens and the second set of extended tokens includes parsing the source string record and the target string record into substrings of variable length.

9. The method of claim 1, wherein calculating the overall similarity score includes calculating the intersection of the first set of tokens and the second set of tokens.

10. The method of claim 2, wherein calculating the overall similarity score includes calculating a size of the intersection of the first set of extended tokens and the second set of extended tokens over the size of the union of the first set of extended tokens and the second set of extended tokens.

11. The method of claim 1, wherein calculating the overall similarity score includes calculating the percentage of common tokens between the first set of tokens and the second set of tokens.

12. The method of claim 1, further comprising:
receiving source and target string record specifications associated with a plurality of source string records and target string records;
receiving semantic knowledge referring to tokens of the source string records and target string records;
creating sets of tokens for the source string records and the target string records based on the semantic knowledge;
assigning similarity scores to the source string records and the target string records based on a semantic relationship between the sets of tokens;
matching the source string records and the target string records based on the similarity score; and
returning matching sets of string records based on the matching.

13. A method of semantic-aware record matching, comprising:
receiving a source string record and a target string record;
tokenizing the source string record into substrings of variable length to form a first set of tokens with each token of the first set of tokens having a weight, the weight of each token associated with the tokens commonality in the source string record specification;
tokenizing the target string record into substrings of variable length to form a second set of tokens with each token of the second set of tokens having a weight, the weight of each token associated with the tokens commonality in the target string record specification;
receiving semantic knowledge referring to the tokens of the source string record and target string record;
calculating a similarity score for each pairing of the tokens of the first set and the tokens of the second set based on the semantic knowledge and the weight assigned to each of the tokens;
calculating an overall similarity score to the source string record and the target string record based on the similarity scores; and
matching the source string record and the target string record based on the overall similarity score.

14. The method of claim 13, wherein token weights reflect importance of each token.

15. The method of claim 14, wherein higher weighted tokens are more important that lower weighted tokens.

16. The method of claim 13, wherein common tokens have less weight than less common tokens.

17. A non-transitory computer readable storage medium including computer executable instructions that, when executed on a computer processor, direct the computer processor to perform a method of semantic-aware record matching, the method comprising:
receiving a source string record and a target string record, wherein the source string record comprises a first set of tokens and the target string record comprises a second set of tokens;
receiving semantic knowledge referring to the tokens of the source string record and target string record;
calculating a similarity score for each pairing of the tokens of the first set and the tokens of the second set based on the semantic knowledge, wherein the similarity score is also based on a weight assigned to each of the tokens in the first set based on a commonality of the token in the source string record and assigned to each of the tokens in the second set based on a commonality of the token in the target string record;
calculating an overall similarity score based on the similarity scores;
determining if the source string record and the target string record match based on the overall similarity score; and
indicating results of the determining.

18. The computer readable storage medium of claim 17, wherein the method further comprises extending the first set of tokens to create an extended first set of tokens and the second set of tokens to create an extended first set of tokens based on the received semantic knowledge.

19. The computer readable storage medium of claim 18, wherein the method further comprises receiving a set of weight values related to the extended first and second sets of extended tokens and calculating a similarity score for the extended first and second sets of extended tokens based on the received weight values.

20. The computer readable storage medium of claim 18, wherein the method further comprises assigning weight values to each token of the extended first and second sets of extended tokens, each weight representing a level of importance of a token in a corresponding string record.

* * * * *